July 8, 1941.  C. RATZ  2,248,198
REMOVABLE OVEN SPLATTER TRAY
Filed March 2, 1939   2 Sheets-Sheet 1
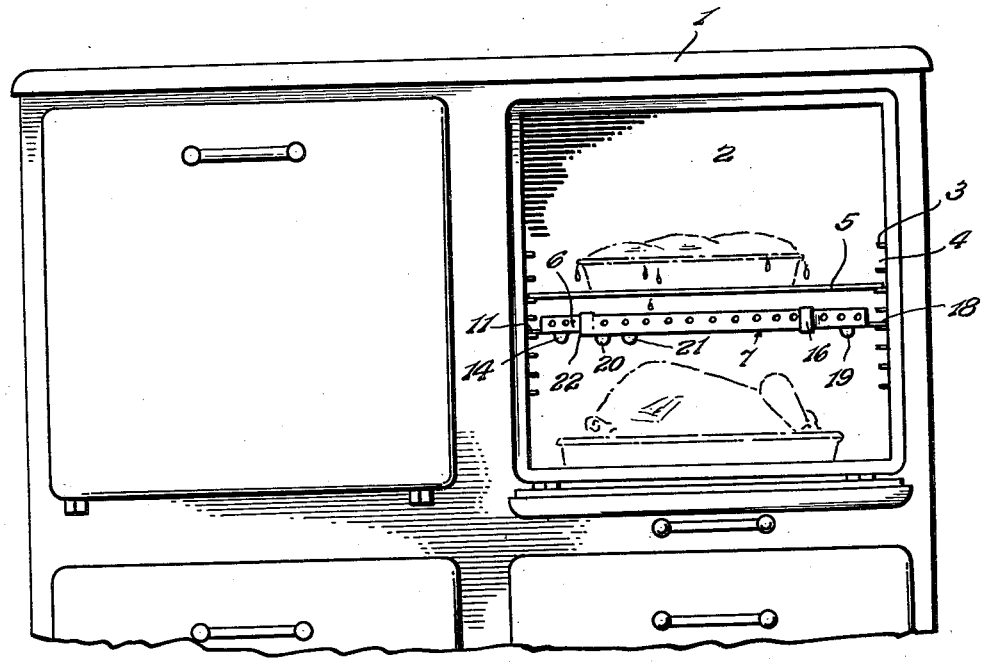
Inventor
Carrie Ratz.
By Lacey & Lacey
Attorneys

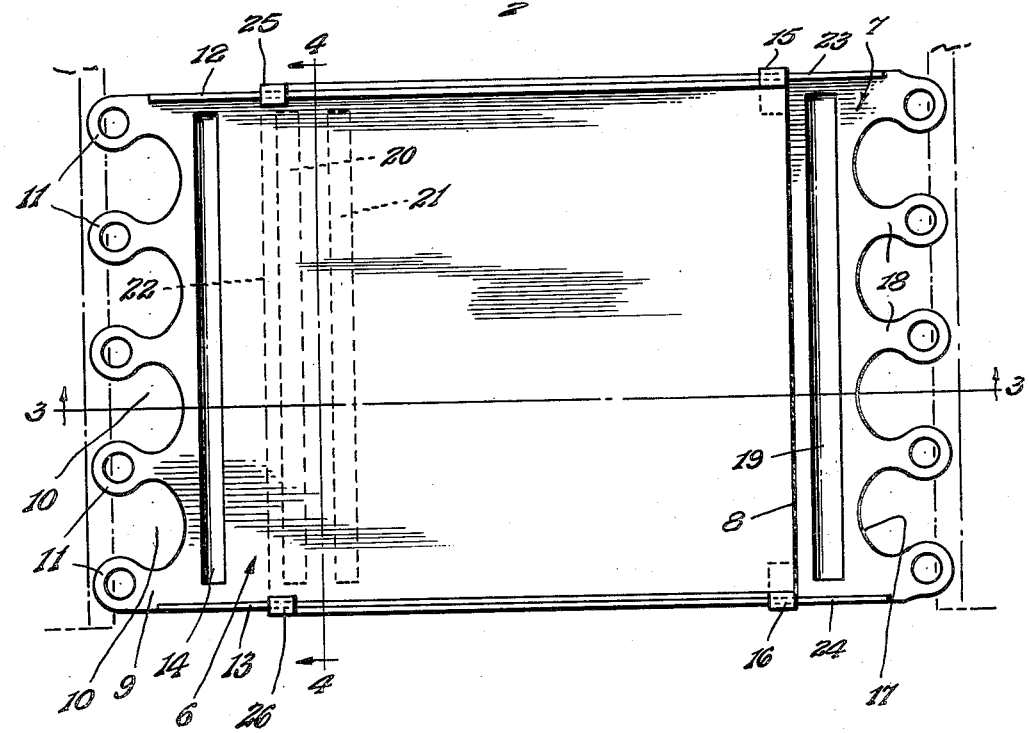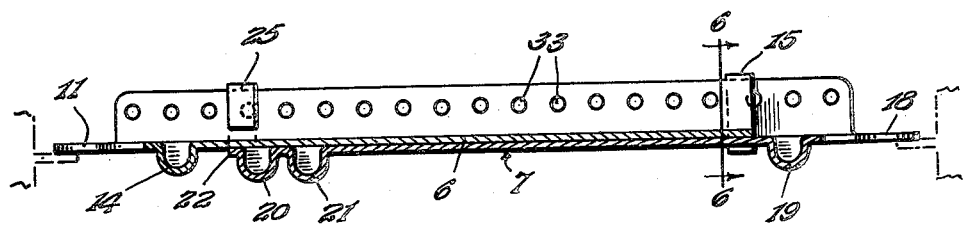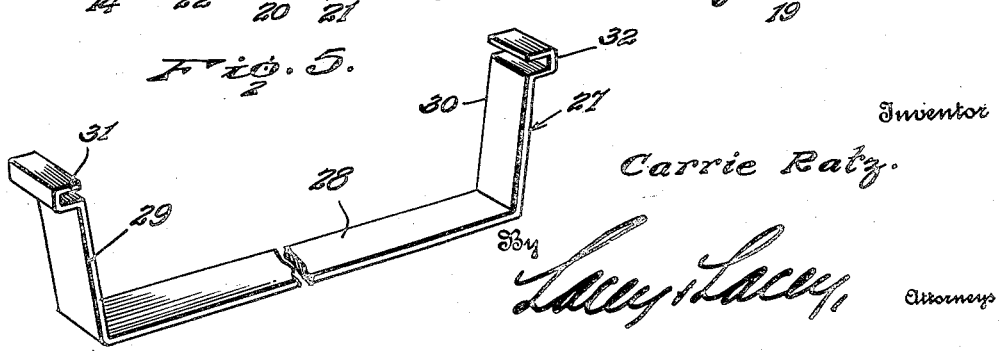

Patented July 8, 1941

2,248,198

UNITED STATES PATENT OFFICE 2,248,198

REMOVABLE OVEN SPLATTER TRAY

Carrie Ratz, Hampshire, Ill.

Application March 2, 1939, Serial No. 259,430

8 Claims. (Cl. 53—5)

This invention relates to an improved removable oven splatter tray which is more particularly designed for use with ovens and seeks, among other objects, to provide a device of this character which will fit within an oven beneath a baking pie, or other food or foods, and catch any surplus juices overflowing therefrom so that said juices will not be permitted to drop to the bottom of the oven or upon other edibles baking in the lower compartment of the oven.

Another object of the invention is to provide a removable oven splatter tray which will be adjustable to fit ovens of various widths.

A further object of the invention is to provide a removable oven splatter tray comprising sections which are connected in such a manner that they will not become accidentally detached.

As a further object, the invention seeks to provide a removable oven splatter tray, the ends of the sections of which are cut away to define openings to permit free circulation of heat both above and below said tray when in operative position in the oven.

A further object of the invention is to provide a device of this character wherein depressions are formed in each of the sections for the purpose of holding juices caught due to overflowing of vessels above the tray.

Another object of the invention is to provide a removable oven splatter tray which may be readily removed when desired, for the purpose of cleaning or for any other purpose.

And a still further object of the invention is to provide a device of this character employing means for supporting it within an oven where said oven is not provided with the usual tray or rack receiving grooves.

Other and incidental objects of the invention not specifically mentioned hereinabove will become apparent during the course of the following description.

Referring now to the drawings forming a part of my application:

Figure 1 is a front elevation showing my improved removable oven splatter tray in operative position in an oven.

Figure 2 is a top plan view of my device.

Figure 3 is a longitudinal sectional view on the line 3—3 of Figure 2, looking in the direction indicated by the arrows.

Figure 4 is a transverse sectional view on the line 4—4 of Figure 2.

Figure 5 is a detail perspective view showing one of the legs which may be employed with my improved removable oven splatter tray should an oven in which said tray is to be used not be provided with suitable tray receiving grooves.

Figure 6 is a detail sectional view on the line 6—6 of Figure 3, looking in the direction indicated by the arrows.

Figure 7 is a fragmentary view showing a slightly modified form of support.

Referring now more particularly to the drawings, wherein like numerals of reference will be seen to designate similar parts throughout the various views, the numeral 1 indicates, in general, a stove which may be of any suitable conventional type. The stove is provided, of course, with an oven compartment, shown at 2, the oven compartment having brackets or cleats 3 defining grooves 4 for receiving racks 5 on which cooking vessels are disposed.

My improved removable oven splatter tray is best seen in detail in Figures 2 and 3 of the drawings and will be seen to include cooperating sections 6 and 7 which are, as shown, slidably engageable. The section 6 is formed with a straight inner end 8 and outer end portion 9. The outer end portion 9 is stamped or otherwise cut away to define openings 10 which are for the purpose of permitting ready circulation of air above and below the removable oven splatter tray when in use. Apertured lugs 11 are defined by the cut away portions 10 and these lugs are engageable in the grooves 4 of the oven. The section 6 is formed with side flanges 12 and 13 extending throughout the major portion of the length of said section. Formed in the section 6 near the outer end thereof and near the cut away portion 10, is a laterally extending depression or trough 14 which is for the purpose of receiving juices overflowing from cooking vessels above the device, until such time as said juices can be removed. At the inner end 8 of the section 6, the flanges 12 and 13 are each provided with bowed latches 15 and 16, the purpose of which will be described hereinafter.

The section 7 is quite similar to the section 6 in every detail. The section 7, as stated, is to be disposed in mating relation to the section 6. The section 7 has cut away portions 17 which define lugs 18 which, like the lugs 11, are apertured, and are adapted to engage in the slots or grooves 4 in the oven at the opposite side from the grooves in which the lugs 11 engage. The section 7 has a trough or depression 19 formed transversely thereof near its outer end and near the cut away portions 17. The trough 19 is for the same purpose as the trough 14. It should be understood that while I have shown the troughs as being relatively deep, they may be of any desired depth. Two more of the troughs are shown at 20 and 21 and are disposed adjacent each other at the inner end 22 of the section 7. The section 7 is provided with side flanges 23 and 24 adapted to mate with the flanges 12 and 13. That is to say, the flanges 23 and 24 engage the outer surfaces of the flanges 12 and 13 in sliding relation thereto. On the side flanges 23 and 24, at the inner end 22 of the section 7, I provide bowed portions which define latches 25 and 26. The latches 15 and 16 on the section 6 fit about the flanges 23 and 24 of the section 7 while the latches 25 and 26 fit about the flanges 12 and 13 in sliding relation thereto. As will be seen in Figure 6 of the drawings, the latches 15 and 16 are provided with extensions 15a and 16a which extend beneath the section 7 and serve the purpose of preventing the section 6 from tipping upward with respect to section 7. The extensions are also engageable with portions of the trough 21 for assisting and preventing separation of the sections. This feature may also be seen in Figure 1 of the drawings. It will now be understood that the sections 6 and 7 cannot be disengaged by pulling them apart for the reason that the latches on the respective sections will engage each other and limit said sections against separation. In order to separate the sections they are moved toward each other until the latches free their respective flanges, when said sections may be disengaged.

In Figure 5, there is shown in fragmentary perspective, a leg or support 27.

The support 27 has a flat portion 28 and upstanding legs 29 and 30. The upper ends of said legs 29 and 30 are bowed at 31 and 32, so that they may be engaged with the end lugs 11 of the group of lugs on the section 6 or the end lugs of the group of lugs carried on the section 7. That is to say, one of the supports will be carried at each end of the removable oven splatter tray so that the same may be mounted in an oven which is provided with either no grooves or too few of them to permit the addition of the removable oven splatter tray.

It is thought that the purpose and operation of my improved removable oven splatter tray will be clearly understood from a reading of the foregoing description. However, a few remarks concerning the installation and operation of the device are not thought to be out of place. In installing the device, it is only necessary to spread the sections 6 and 7 so that the lugs 11 and 18 will engage respectively in grooves carried at the opposite sides of the oven. My removable oven splatter tray may be installed at the bottom of the oven for the purpose of keeping overflow from cooking vessels from falling and drying on the bottom of the oven to soil the same. My improved removable oven splatter tray has proved highly efficient when positioned as shown in Figure 1 of the drawings, that is to say, beneath the rack 5 on which a baking pie or other juicy edible is mounted. In this position, juices overflowing from the pie will be caught on the tray and will be led to the depressions or troughs 14, 19, 20 and 21. The juices may be removed, of course, when the tray is removed from the oven. These juices are thereby prevented from reaching other food being cooked in the lower compartment of the oven. Bread or the like, which is to be baked substantially dry, is thus kept free from juices spilling from foods cooking thereabove and will be allowed to retain its proper taste.

As shown at 33, the side flanges 12, 13, 23 and 24 may be apertured to aid its heat circulation.

It is desired particularly to point out that my improved oven splatter tray is not in any sense of the word a baking pan or utensil of any kind or description. Its sole and only purpose is to catch moisture and juices such as might bubble over from casserole cookery, pies, or any moist cookery and prevent said mixture from reaching dry cooking foods or having juices drip on other foods or the bottom of the oven. When it is in use, it divides the oven into separate cooking compartments. It may be readily adjusted to various oven sizes and may be quickly and easily removed for cleaning or otherwise. Any or all of these and other combinations thereof can be used without departing from the spirit of the usefulness and purpose of the invention.

In the modification of the invention as shown in Figure 7 of the drawings, the support 27 is provided with an eye 50 which is adapted to receive therethrough one of the lugs carried at the end of the tray sections. This structure may be substituted for the bowed portions 31 and 32 of the support 27, if desired. The structure of the modification is otherwise identical with that of the preferred form.

Having thus described the invention, what I claim is:

1. In a removable oven splatter tray, a pair of mating sections, each of said sections having cut away portions defining lugs engageable in oven grooves whereby the device may be supported in an oven, said sections being adjustable for use in various sizes of ovens, and means slidably connecting the sections for permitting movement of said sections with respect to each other, said means preventing tilting of the sections with respect to each other.

2. In a removable oven splatter tray, a pair of mating sections, each of said sections having cut away portions defining lugs engageable in oven grooves whereby the device may be supported in an oven, said sections being adjustable for use in various sizes of ovens, and means slidably connecting the sections for permitting movement of said sections with respect to each other, said last mentioned means preventing accidental separation of the sections by spreading movement.

3. In a removable oven splatter tray, mating sections, each section having cut away portions defining lugs, said cut away portions permitting heat circulation above and below the tray and said lugs being engageable in oven grooves for supporting the tray, said sections having slidably engageable side flanges, and latches formed on the side flanges of each of the sections, said latches having bowed portions engageable over the flanges of the mating sections for slidably connecting the sections, said latches being engageable at full extension of the sections for preventing separation of said sections.

4. In a removable oven splatter tray, mating sections, each of said sections having a depression defining a trough, and means slidably connecting the sections, said removable oven splatter tray being adapted to fit within the oven and said troughs being designed to catch overflow from cooking vessels disposed above the tray in the oven, said means including latches having extensions engageable with portions of the trough for assisting in preventing accidental separation of the sections and tilting the said sections with respect to each other.

5. In a removable oven splatter tray, mating sections, each of said sections having a depression defining a trough, said sections having side flanges and having cut away portions defining lugs, said cut away portions permitting free circulation of air above and below the removable oven splatter tray and said lugs mounting the tray in the mounting grooves of an oven, and latches carried by the side flanges and having bowed portions engageable over mating flanges whereby the sections will be slidably and adjustably connected, said latches preventing accidental separation of the sections by spreading or tilting.

6. A removable oven splatter tray as recited in claim 5, including a support having legs with their corresponding upper ends engageable with lugs at each side of the tray sections whereby said removable oven splatter tray may be supported in ovens having no tray receiving grooves.

7. A removable oven splatter tray having cut away portions defining lugs engageable in oven grooves whereby said tray may be supported in an oven.

8. In a removable oven splatter tray, a pair of sections, each of said sections having cut away portions defining lugs engageable in oven grooves whereby the device may be supported in an oven, and means slidably connecting the sections for permitting adjustment of said sections.

CARRIE RATZ.